United States Patent [19]

Blanz

[11] Patent Number: 5,678,900
[45] Date of Patent: Oct. 21, 1997

[54] UNLOADER FOR A SOURCE OF AIR UNDER PRESSURE ON VEHICLES

[75] Inventor: Roland Blanz, Heiligkreuzsteinach, Germany

[73] Assignee: Grau GmbH, Heidelberg, Germany

[21] Appl. No.: 574,846

[22] Filed: Dec. 19, 1995

[51] Int. Cl.[6] ..................................................... B60T 13/00
[52] U.S. Cl. ..................... 303/6.01; 303/60; 137/899.4; 137/115.19; 137/118.06
[58] Field of Search ................ 303/6.01, 13, 69, 303/60, 115.19, 115.23, 118.06, 119.1, 899.4, 596.15, 596.16; 280/714, 711

[56] References Cited

U.S. PATENT DOCUMENTS

| 3,941,432 | 3/1976 | Blanz | 303/6.01 X |
|---|---|---|---|
| 4,057,298 | 11/1977 | Seegers | 303/60 X |
| 5,044,399 | 9/1991 | Blanz | 137/596.15 |

FOREIGN PATENT DOCUMENTS

| 0 555 500 | 2/1992 | European Pat. Off. . |
|---|---|---|
| 3506178A1 | 8/1986 | Germany . |

*Primary Examiner*—Robert J. Oberleitner
*Assistant Examiner*—Pamela J. Lipka
*Attorney, Agent, or Firm*—Thomas, Kayden, Horstemeyer & Risley

[57] ABSTRACT

A compressed air unloader for unloading compressed air used in the compressed air braking and suspension circuits of a motor vehicle is disclosed. The unloader includes a housing with an internal air chamber, an air inlet for passing compressed air into the air chamber, a compressed air outlet, and a controlled outlet valve in the compressed air outlet for venting compressed air in the air chamber to the atmosphere when the valve is opened. An electronic control unit opens and closes the outlet valve. The air chamber also has an air chamber check valve and a pressure sensor downstream of the check valve. An integral multi-circuit control valve assembly is formed within the housing, the control valve assembly including a plurality of generally identical control and monitor units positioned downstream of the air chamber check valve and the pressure sensor, each of the control and monitor units comprising a control and monitor unit check valve opening against the direction of the air flow therethrough, an overflow valve for passing compressed air from the control and monitor unit, an actuator for operating the overflow valve, and an air pressure sensor positioned downstream of the control and monitor unit check valve.

19 Claims, 5 Drawing Sheets

UNLOADER FOR A SOURCE OF AIR UNDER PRESSURE ON VEHICLES

FIELD OF THE INVENTION

This invention relates to a compressed air unloader used on motor vehicles. More particularly, this invention relates to an air pressure unloader for use on commercial motor vehicles, the unloader being positioned between an air compressor and an integrated multi-circuit protection valve, from which several air line circuits branch to the air reservoirs and the pneumatic brakes and/or suspension circuits of the vehicle.

BACKGROUND OF THE INVENTION

An unloader of the type described above is known from DE 35 06 178 A1. This unloader has a housing with an inlet connection and an outlet leading to the atmosphere. For each air circuit a line leading to a separate air reservoir is connected to a chamber in the housing. A check valve is located between the chamber and the connection of the air line to the reservoir, the check valve opening in the flow direction of the air under pressure for preventing reverse air flow. Upstream of the check valve is an outlet valve, with which a control device is used for opening and closing the outlet valve. The control device is equipped with a 3/2-way solenoid valve. An air pressure sensor is provided in the form of an element which transforms air pressure to voltage and detects the pressure downstream of the check valve. The outlet valve is designed as a quick release valve having a membrane. The solenoid valve is controlled by an electric control unit to switch between the loading phase, in which the reservoirs are filled with air under pressure, and the idle phase, in which the compressor pumps the air from the atmosphere through the unloader via the outlet valve into the atmosphere. Thus, an electronic unloader is created with the same function as known mechanical unloaders.

Another known unloader is also disclosed in DE 35 06 178 A1, being used as a part of a source of pressurized air on vehicles, provided as a separate unit, in which there is an air line between the unloader and a multi-circuit protection valve. The known multi-circuit protection valves have separate housings, in which more than one overflow valve is usually provided. Air lines lead from the outlets of the housing of the multi-circuit protection valve to the air reservoirs allocated to each of the circuits. Thus, a system is created from a number of separate elements, i.e. an unloader, a multi-circuit protection valve, an air-drier, and so on, connected to each other by air lines. This makes mounting the assembly on a vehicle difficult and time consuming. Even if an unloader is combined only with an air-drier, the expenditure of time and effort is not substantially reduced.

Thus, it is an object of this invention to provide an electronic unloader of the type described above, which also performs as a multi-circuit protection valve.

SUMMARY OF THE INVENTION

This object is achieved by providing a plurality of similarly designed control and monitor units within the housing of an unloader integrated with a multiple-circuit protection or control valve, the control units branching off after the check valve of the unloader. Each control and monitor unit comprises a check valve opening against the air flow direction, actuation means to control the opening of an overflow valve, and a pressure sensor to detect air pressure downstream of the controlled check valve.

This invention starts with the idea of integrating an unloader and a multi-circuit protection valve in a common housing along with an air-drier, if needed. The control and monitor units, each of which belong to the multi-circuit protection valve, may be designed and arranged in a similar manner, but are each controlled in a different manner depending on different adjustments or control philosophies between the different circuits dependent on use. The design of the unloader can be varied by using a number of substantially similar control and monitor units, each of which has to be controlled as is it functioned as an unloader. The control and monitor units belonging to each of the multi-circuit protection valves must be provided with a check valve, each closing against the air flow direction to fulfill the function of protecting the circuits.

Additionally, each control and monitor unit must be provided with an overflow valve, through which the pressurized air flows into the air reservoir of each circuit. The overflow valve of each circuit is provided with an actuation means to open and to close the overflow valve. Finally, a pressure sensor is provided as a part of each control and monitor unit, the pressure sensor detecting air pressure downstream of the check valve, i.e. in the reservoir. Each of the control and monitor units may be adjusted and/or controlled in a different manner in order to get a priority charging in the first two service brake circuits via the multi-circuit protection valve. Thus, a useful compact device is created at low cost.

Separate air lines between the unloader and the multi-circuit protection valve are omitted, the function of the air lines being performed by bores in the integrated assembly housing. The safety function of the unloader is affected also by the outlet valve of the unloader, which may be a check valve opening to the atmosphere. The different phases of the unloader, loading and running idle, are switched by the control and monitor unit for opening, and subsequently closing, the unloader. Each circuit may be handled separately in the multi-circuit protection valve. The possibility also exists to create groups of circuits, and to control these groups of circuits in a different or similar manner. It is also easy to perform a pressure limiting or reducing function in the multi-circuit protection valve. No additional expenditure is needed. The control and monitor unit need only be controlled so as to reach the desired pressure in the reservoir of each respective circuit. Each control and monitor unit is designed with a few relatively simple and easily replaceable elements. In addition, the possibility also exists to integrate a regenerating air-drier in the unloader and multi-circuit protection valve assembly. Separate air lines for this air-drier are thus avoided and the whole unit becomes even more compact.

The overflow valve actuation means comprises a 3/2-way solenoid valve, i.e. a solenoid valve with its own air outlet, the solenoid valve controlling the opening and closing of the overflow valve. Such a solenoid valve may be controlled by electric signals. The pneumatic control lines of the actuation means and/or the solenoid valve may be located in the housing of the unloader within bores, and need very little room to be provided therein. The pressure sensors used to detect the air pressure downstream of the check valve and located in each circuit, may be transducers of the type which convert pneumatic pressure into electrical voltage to generate an electric signal for control processing.

The check valve of each control and monitor unit may be designed as a safety valve. Accordingly the valve body of the check valve is suspended on a spring adjusted to a high pressure release force. The force of the spring may correspond to a protected pressure of 7 bar in a circuit. Thus, the protection of the circuit is realized in the multi-circuit protection valve. In the sense of a safety valve, this guarantees at an emergency air source within handling of the vehicle will exist of a protected air pressure, even if one air circuit should fail.

A common electronic control unit is provided to actuate the controlled outlet valve of the unloader, and the control and monitor units. The electronic control unit controls the solenoid valves of the actuation means with respect to the pressures detected by each of the air pressure sensors. This electronic control unit allows for a number of possibilities concerning the control of the single circuits. The common electronic control unit may comprise a monitor unit located in the cab of the vehicle. Thus the driver can see if, and up to which extent, the different air reservoirs of the different air circuits are filled with air under pressure and are ready for driving. The electronic control unit is also programmable based upon several different control philosophies. The monitor unit in the cab works with manometers also, thus avoiding the need to pass pneumatic lines up to the cab.

A regenerating air-drier may also be provided in the air chamber of the unloader ahead of the check valve, the air-drier being controlled by the common electronic control unit, and for air regeneration purposes a 3/2-way-solenoid valve and a check valve are provided. A separate air-drier for regeneration purposes is thus avoided.

In a very simple design, each of the check valves and the over-flow valve for each control and monitor unit may be designed as an integrated unit. Both functions are thus fulfilled from one single structural element. Here, however, it is necessary to actuate the valve body of the check valve via the actuation means.

A piston having a control rod is provided for the check valve of each control and monitor unit. The pressure chamber of each piston may be vented via the solenoid valve of each control and monitor unit. The actuation means, including the solenoid valves of the unloader and the multi-circuit protection valve, may be designed in a similar manner. It is thus possible to control each overflow valve or check valve of each circuit individually. But it is also possible to vent the pressure chambers of more than one piston of a plurality of control and monitor units via a common solenoid valve.

A humidity sensor may be provided for controlling the regeneration of the air-drier, the sensor being positioned in the common inlet chamber of the multi-circuit protection valve.

A safety valve opening to the atmosphere may be provided downstream of each check valve, the opening pressure of the safety valve being adjusted between the service pressure of the brake circuit concerned and the opening pressure of the controlled outlet valve. In the case of different service pressures in the circuits, each reservoir is protected.

A throttle may be located in parallel and connected to the check valve. A limited air exchange is thus possible at all times, for example between the air suspension circuit with its large volume and the inlet chamber in the unloader with its little volume. The advantage is that the cycle in which the unloader loads the reservoirs, and in which the unloader is running idle, i.e. the duration of the loading phase and the duration of the idle phase, is extended.

BRIEF DESCRIPTION OF THE DRAWINGS

Preferred embodiments of the invention are described in detail in connection with the following drawings, which show in.

DETAILED DESCRIPTION

Figure 1:
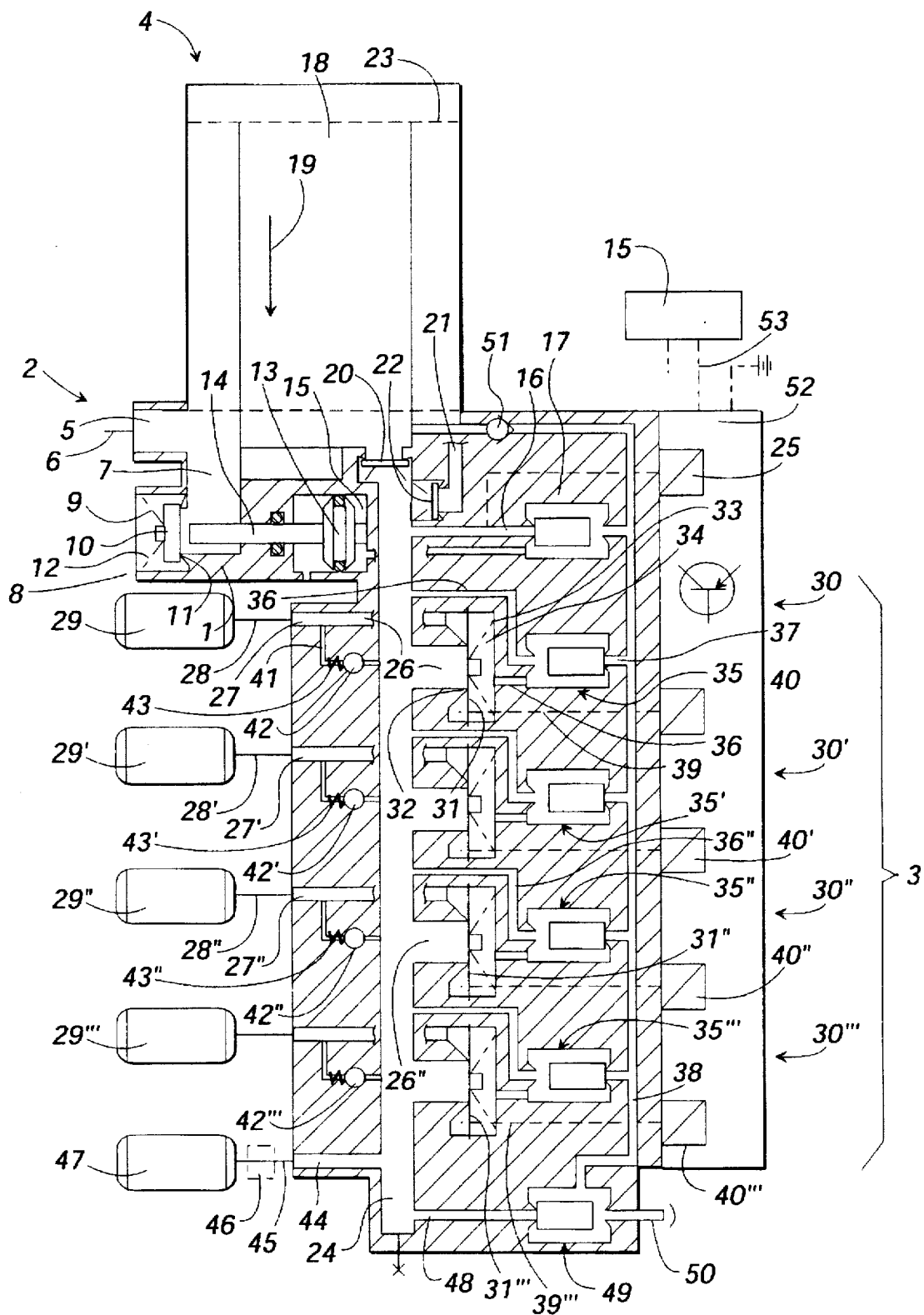
FIG. 1 a schematic cross section of a first embodiment of the unloader with an integrated multi-circuit protection valve, FIG. 2 a schematic cross section of a second embodiment of the unloader with an integrated multi-circuit protection valve, FIG. 3 a third embodiment of the unloader, FIG. 4 a fourth embodiment of the unloader having a two-circuit protection valve, FIG. 5 a partial detailed view of the unloader of either FIG. 2 or FIG. 3, and in FIG. 6 a fifth embodiment of the unloader having an improved regeneration cycle.

FIG. 1 shows an electronic unloader 2, a multi-circuit protection or control valve 3, and an air-drier 4 integrated with one another in a common housing 1. Unloader 2 comprises an inlet 5 connected with a compressor, not shown, for providing pressurized air via air line 6. The inlet 5 opens into a chamber 7, and is connected with a controlled outlet valve 8 having an outlet 9 to the atmosphere. The controlled outlet valve 8 comprises a valve body 10, a corresponding valve seat 11 formed on housing 1, and is supported on a spring 12. A piston 13 having a control rod 14 is also provided as a part of valve body 10. Piston 13 is provided with a pressure chamber 15 connected to an air line 16, in which a 3/2-way-solenoid valve 17 is positioned.

Housing 1 also includes an air-drier 4 from which chamber 7 branches into a pellet chamber 18, and through which pressurized air flows in the direction of arrow 19 during the load-phase of the compressor. A check valve 20 is located at the end of pellet chamber 18. The check valve 20 is an element of unloader 2, and marks its end, within housing 1. A bypass 21, having a check valve 22, is provided for use when the pellet chamber 18 is full of dirt preventing the pass of air. The check valve 22 has the same function as the check valve 20, but only for emergency conditions, in which pressurized air flows through a coarse filter 23 rather than through pellet chamber 18.

The check valve 20 is a normal check valve, i.e. its valve body is supported on a relatively weak spring (not illustrated). Check valve 20 opens into an inlet chamber 24 formed as a part of the multi-circuit protection valve 3. The air line 16, leading to the solenoid valve 17 and also to the pressure chamber 15 of piston 13 of controlled outlet valve 8 of unloader 2, is connected with the inlet chamber 24. An air pressure sensor 25 detects the pressure in air line 16 and thus in the inlet chamber 24.

The multi-circuit protection valve 3 of FIG. 1 is designed for several pneumatic circuits. Each circuit has a branch line 26 leading to a connection 27 on the housing 1, and from here to an air line 28 ending in an air reservoir 29 for each circuit. A control and monitor unit 30 is provided for each circuit, comprising an overflow valve 31 in air line 26. The overflow valve 31 has a membrane formed as the valve body, received on a valve seat 32 formed on housing 1, and supported on a spring 33. The spring 33 is located in a pressure chamber 34 connected to the inlet chamber 24 via a control line 36, in which a solenoid valve 35 is arranged. Solenoid valve 35 is a 3/2-way-solenoid valve, i.e. it has 3 connections and 2 positions. One of the connections is an outlet 37 connected with a line 38 leading to the atmosphere. The solenoid valve 35 of FIG. 1 is shown in the non-excited state, in which the outlet 37 is closed and the pressure of the inlet chamber 24 is in the pressure chamber 34. Thus, the overflow valve 31 is held closed, its membrane being loaded with the same air pressure on both sides, and where one side of the membrane the spring 33 acts additionally. A pressure sensor 40 with air line 39 is provided to detect the pressure downstream of the overflow valve 31, and thus in the air reservoir 29. An air line 41 is positioned in parallel to air line 26, air line 41 also leading from the inlet chamber 24 to the connection 27. A check valve 42 is located in air line 41 in the direction shown, the valve body of which is supported on a spring 43. Spring 43 is a relatively strong spring adapted to an opening pressure of 7 bar, for instance, thus acting as a safety valve in addition to being a check valve also. In case of air pressure failure, emergency air service for the vehicle can thus be maintained during driving.

As illustrated in FIGS. 1-6 the above described elements are arranged in four separate air circuits. The numbered elements of the second circuit are indicated by one stroke, for example the control and monitor unit 30' of circuit II. The numbered elements of the third circuit show two strokes, and the numbered elements of the fourth circuit show 3 strokes. Thus, four circuits are provided, circuits I and II being the service brake circuits, circuit III being adopted to the secondary braking system, and circuit IV is provided for further pneumatic devices. These four circuits are positioned in housing 1 parallel to one another, each circuit being similarly designed and equipped.

In addition, housing 1 includes a connection 44 and an air line 45 leading to an air reservoir 47 via an overflow valve 46. The bellows of an air suspension system of the vehicle may be connected to reservoir 47, for example. In this circuit, essentially a fifth circuit, there is no control line 36, no overflow valve 31, and no control and monitor unit 30. Reservoir 47 is directly loaded by the compressor. An air line 48 leads from inlet chamber 24 to a solenoid valve 49 having an exhaust opening 50, to which, in the non-excited state of the solenoid valve 49, air line 38 is connected. The regeneration phase of the air-drier 4 is controlled via this solenoid valve. If solenoid valve 49 is excited, exhaust opening 50 is closed and the air under pressure in reservoir 47 flows backwards through the pellet chamber 18 via air lines 48 and 38, and a check valve 51, and thus removes the humidity from the pellets in the pellet chamber 18. In this regeneration phase of the air-drier 4, the solenoid valve 17 is excited by an electronic control unit 52, and outlet valve 8 is opened so that the compressor (not illustrated) pumps its air to the atmosphere, i.e. non-load condition.

The electronic control unit 52, shown schematically in FIG. 1, controls the solenoid valve 17 of the electronic unloader 2 and the solenoid valves 35, 35', 35", 35"' and 49 of the multi-circuit protection valve 3. Control unit 52 is connected with a monitor unit 54 via an electric line 53. The monitor unit 54 will typically be placed in the cab of the vehicle on which the unloader is used. The pressure sensors 25, 40, 40', 40" and 40"' transform air pressure into voltage, i.e. an appropriate electrical signal, so the pressures can be indicated in the cab on the monitor unit 54. Each control and monitor unit 30, 30', 30", 30"', and each solenoid valve 17, 35, 35', 35", 35"', and 49 is separately controlled. This allows for the possibility of setting reduced air pressures in the individual circuits in a very simple manner. The reduction in air pressure depends only on the exciting of the solenoid valve, which is controlled by the respective pressure sensors.

Figure 2:
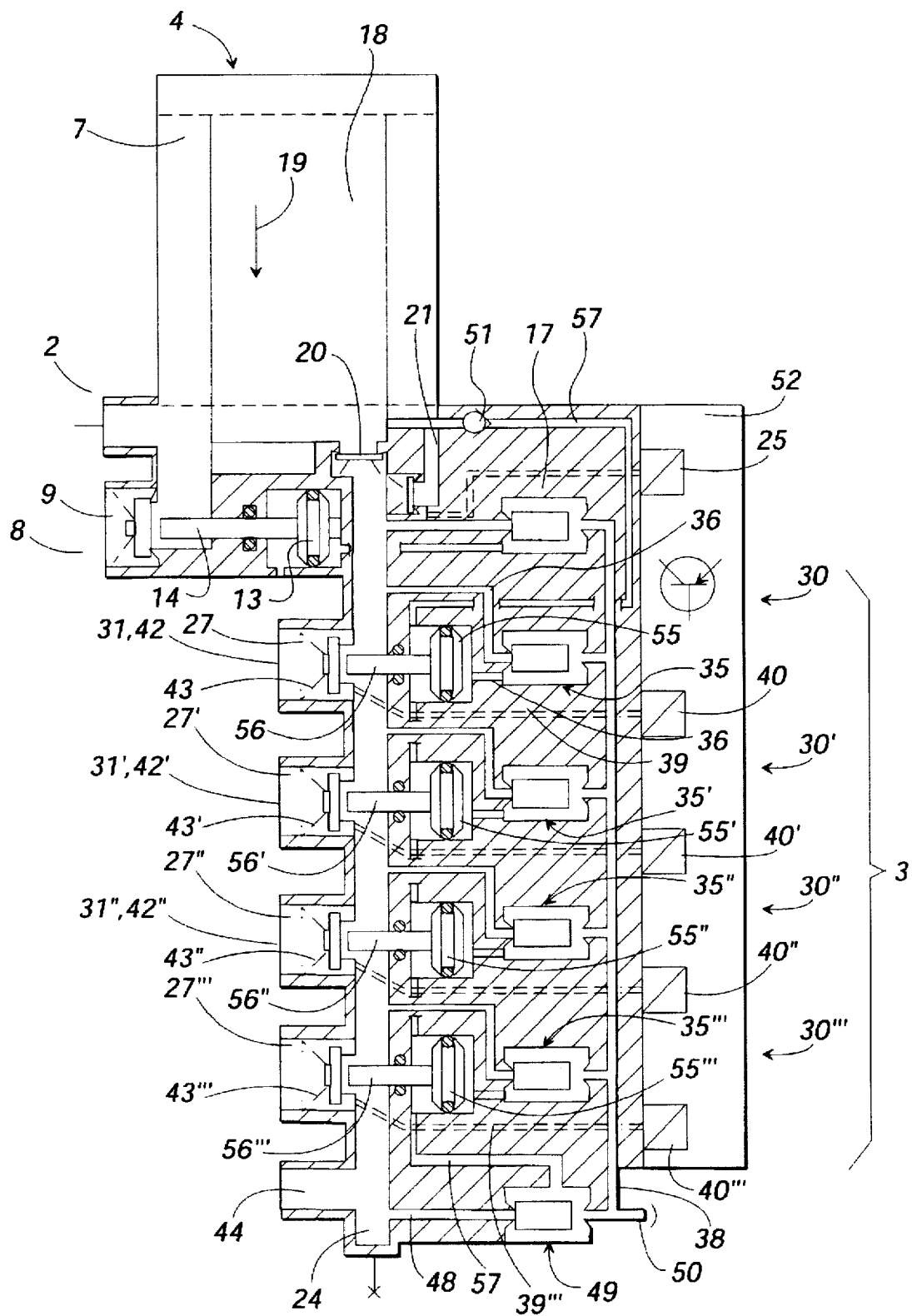

The embodiment of the unloader shown in FIG. 2 is designed in a manner similar to the embodiment of FIG. 1. Only the control and monitor units 30, 30', 30", 30"' are modified. The overflow valves 31, 31', 31", and 31"' are integrated with the check valves 42, 42', 42", and 42"'. Similar to the design of piston 13 and control bar 14 of the unloader, there are provided pistons 55, 55', 55", and 55"', having control rods 56, 56', 56", and 56"'. The solenoid valves 35-35"' in the air lines 36-36"' are closed when not excited, as shown, and thus the pressure chambers 34-34"' are vented to the atmosphere via air line 38. The controlled outlet valves 31, 42-31"', 42"' are thus closed. The valve bodies of the check valves 42-42"' are loaded with the pressure of each air reservoir, respectively, and the force of spring 43-43"' also. If there is an air consumption in one circuit and the air pressure decreases, this will be detected by the pressure sensor 40-40"', the exciting of the respective solenoid valve being controlled by the control unit 52. The respective air circuit will be filled with pressurized air via the opened check valve.

A separate reverse line 57 is provided connecting the chambers on the rod side of the pistons 55-55"', over which air flows backward in the regeneration phase of the air-drier, but which normally has the function of exhausting the chambers on the rod side of the pistons. The elements of the electronic unloader 2 and of the multi-circuit protection valve 3 are designed in a similar manner. Here connection 9 leads to the atmosphere. The connections 27-27"' are connected to the reservoirs 29-29"' respectively. In the unloader 2 of FIG. 2, each air circuit and the unloader 2 are also separately controlled by the common electronic control unit 52.

Figure 3:
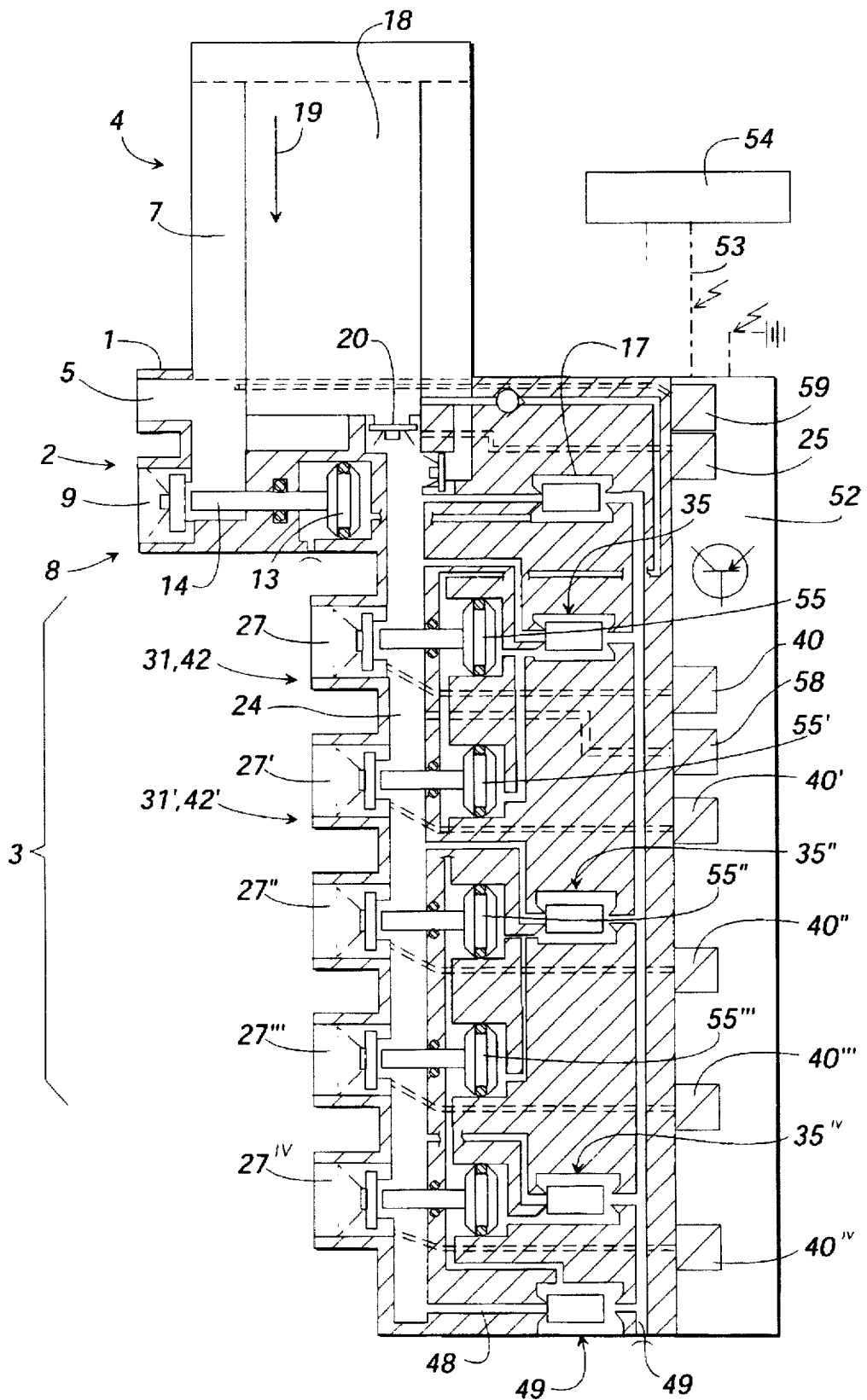

Third embodiment of the unloader is illustrated in FIG. 3, with the modification of only four solenoid valves 35, 35", 35$^{IV}$, and 49 belonging to the multi-circuit protection valve 3. The first two brake circuits with their connections 27 and 27' are commonly controlled via the solenoid valve 35. The two remaining circuits with their connections 27" and 27"' are commonly controlled via the solenoid valve 35". A humidity sensor 58 is connected with the inlet chamber 24, the humidity sensor controlling the regeneration phase of the air-drier 4. Regeneration takes place when the drying effect of the air-drier is no longer sufficient. A pressure sensor 59 is connected with the chamber 7 via an air line 60, detecting the flow resistance of the air-drier 4 by the common electronic control unit 52. The reservoir 47 of the air suspension of the vehicle may be connected with connection 27$^{IV}$. Thus, an overflow valve 46 (FIG. 1) is formed in a similar manner as in the preceding circuits, and this overflow valve is arranged in the housing 1 of the unloader 2.

Figure 4:
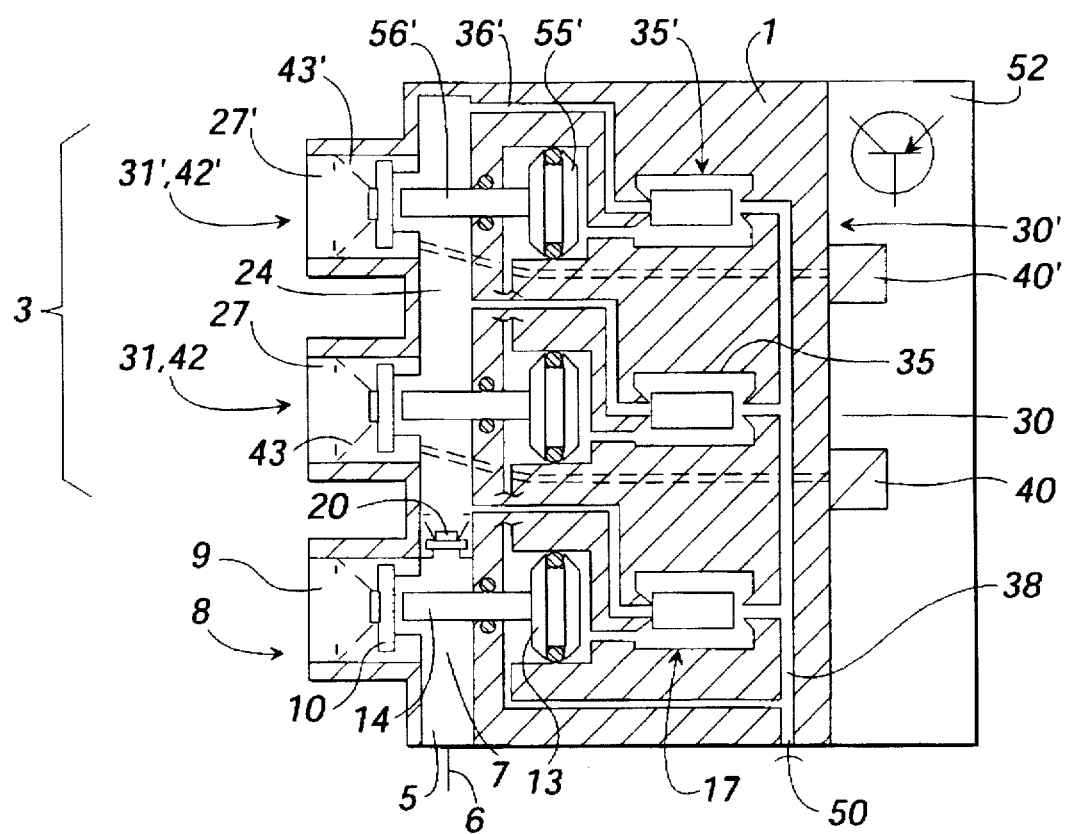

In the embodiment of the unloader 2 and integrated multi-circuit protection valve 3 shown in FIG. 4, air-drier 4 is omitted. Only two circuits are realized. It is the intention of the drawing to show the analogous elements of the unloader 2 and of the multi-circuit protection valve 3 side by side to illustrate the same design. The chamber 7 is only separated from the inlet chamber 24 by the check valve 20. Of course, it is possible to provide more than two circuits in this manner. Controlling of the unloader is done with common electronic control unit 52, which can be programmed depending on the special conditions and desires of the operator, for example priority charging, pressure reduction, or the like.

Figure 5:
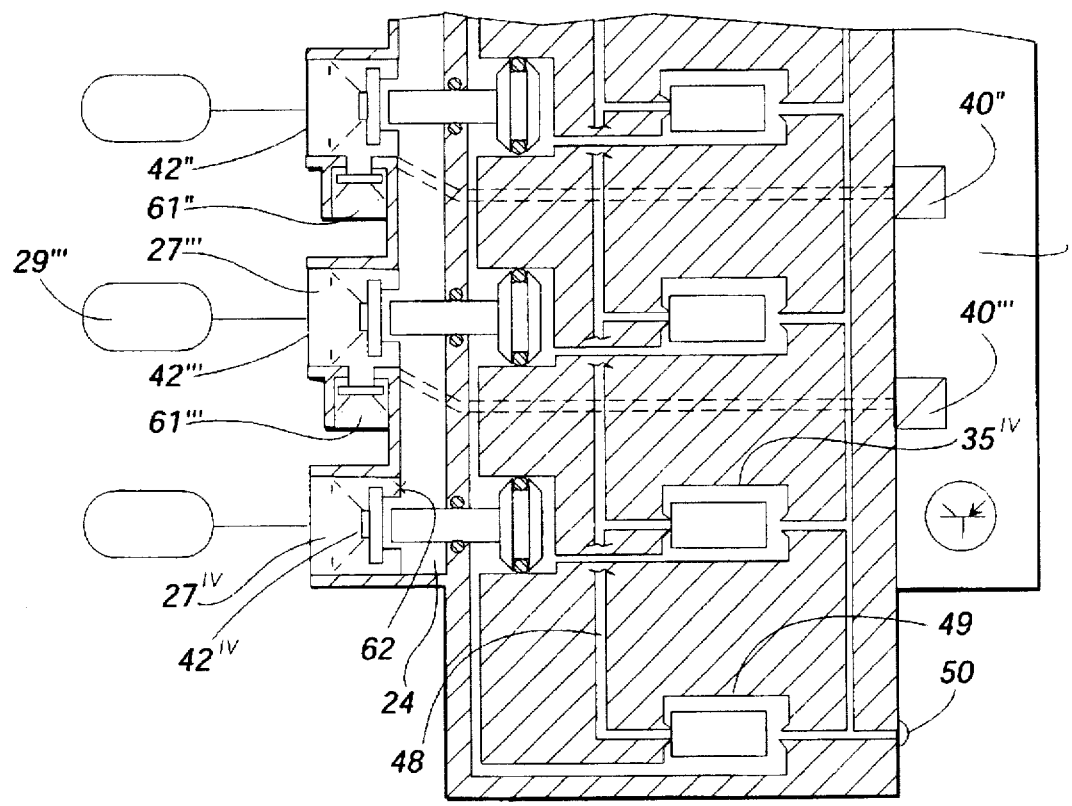

FIG. 5 is a partial detailed view of the combined unloader/air-drier/multi-circuit protection valve. This is a modification of the embodiments of FIGS. 2 or 3. A safety valve 61-61"', opening into the atmosphere, is positioned downstream of each check valve 42-42"', except for check valve 42$^{IV}$. In this fifth circuit, normally connected with the air suspension system of the vehicle, a separate safety valve is not needed because here this function is effected by the outlet valve 8. The arrangement of the safety valves 61, 61', 61" and 61'" is necessary only in those cases in which different pressures have to be maintained in the circuits I to IV. For example, circuits I and II may be provided for service pressures of 10 bar, and circuits III and IV for 8.5 bar. The air suspension circuit V may need 12.5 bar and the outlet valve 8 may be adjusted to 13.5 bar. In this case, the safety valves 61 and 61' are adjusted to 11 bar and the safety valves 61" and 61'" to about 9.5 bar.

A further detail illustrated in FIG. 5. is the provision of throttle 62 in connection $27^{IV}$, arranged parallel to the check valve $42^{IV}$. There is permanent connection through the throttle 62 between inlet chamber 24, with its relatively small volume, to the air suspension circuit, with its comparatively large volume. When the compressor is running idle and there is air consumption in a circuit, the pressure in the inlet chamber 24, having the enlarged volume by the connection via the throttle 62 to the suspension circuit, advantageously decrease not sufficiently to switch the compressor to the loading phase. Without the throttle 62 the volume of inlet chamber 24 is relatively small and an air consumption in a circuit immediately effects a decrease of pressure in the small inlet chamber under the switching point of the unloader. As a result the compressor is switched on and off by the unloader in a very rapid cycle making the noise of a machine gun and not working proper. But with the throttle 62, at all times air exchange is possible through throttle 62. The advantage of this possible air exchange is, that the cycle in which the compressor loads the reservoirs and in which the compressor is running idle, i.e. the duration of the loading phase and the duration of the idle phase, is extended.

Figure 6:
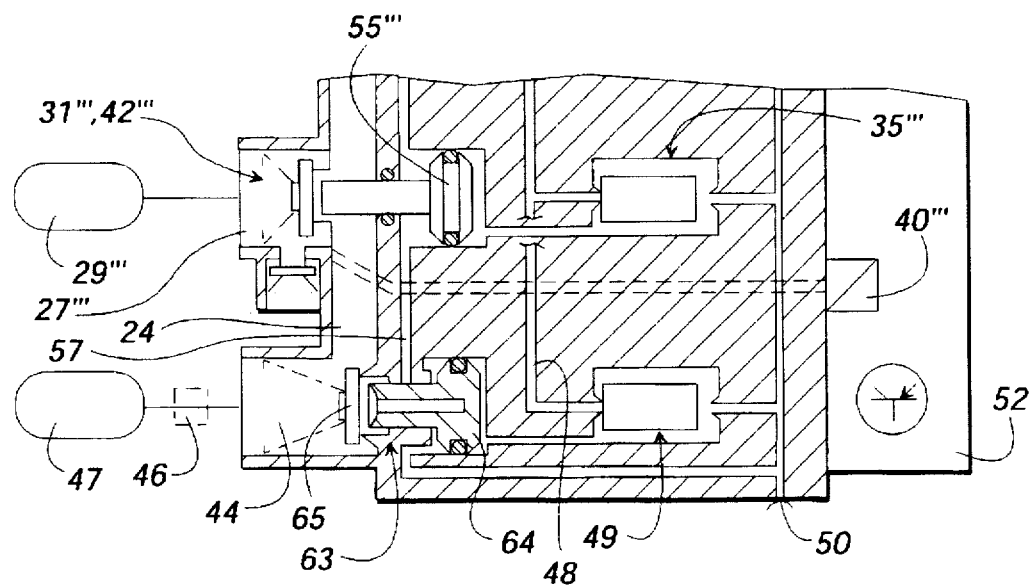

The embodiment of the unloader apparatus shown in FIG. 6 is a modification of the embodiments shown in FIGS. 2 or 3, dealing with the regeneration phase. A 3/2-way-valve 63, having a stepped piston 64 sealingly and slidingly arranged in the housing, is controlled by the solenoid valve 49. The stepped piston 64 is biased with air under pressure on its large surface via the solenoid valve 49. Its piston rod cooperates with the valve body 65 suspended in the manner shown in inlet chamber 24, forming an inlet valve for air under pressure from inlet chamber 24 to the reverse line 57. A sufficiently large cross section may be provided by designing the gap between the piston rod and the opening in the housing. This cross section is larger than the cross section of the solenoid valve 49. In the regeneration phase the large volume of the suspension circuit, in connection with the enlarged cross section between the piston rod and the opening in the housing, is used to shorten the duration of the regeneration phase. This regeneration phase is controlled by the electronic control unit 52, especially via the humidity sensor 58 shown in FIG. 3.

I claim:

1. A compressed air unloader for unloading compressed air used in the compressed air braking and suspension circuits of a motor vehicle, the motor vehicle including an air compressor for producing the compressed air, the unloader including a housing with an internal air chamber, an air inlet defined within the housing for passing compressed air from the air compressor into the air chamber, a compressed air outlet defined within the housing for passing compressed air from the air chamber, the compressed air outlet including an outlet valve constructed and arranged to vent the compressed air in the air chamber to the atmosphere when the valve is opened, the unloader also including a control unit for opening and closing the outlet valve, the air chamber also having an opening defined therein for passing compressed air from the air chamber for use in the compressed air braking and suspension circuits of the motor vehicle and an air chamber check valve oriented in the direction of the compressed air flow positioned within the opening, and a pressure sensor positioned within the housing downstream of the air chamber check valve; said unloader comprising:

a multi-circuit control valve assembly formed within-as a part of the housing, said control valve assembly being constructed and arranged to control the braking and suspension circuits of the motor vehicle, respectively;

said control valve assembly including a plurality of generally identical control and monitor units positioned downstream of the air chamber check valve and the pressure sensor, each of said units being separately furnished with compressed air from the air chamber;

each of said control and monitor units comprising a control and monitor unit check valve opening against the direction of the compressed air flow, an overflow valve for passing compressed air from said control and monitor unit, actuation means for operating said overflow valve, and an air pressure sensor positioned downstream of said control and monitor unit check valve.

2. The unloader of claim 1, wherein each of said control and monitor unit check valves operating as a compressed air safety valve.

3. The unloader of claim 1, said actuation means for said overflow valve comprising a first solenoid valve.

4. The unloader of claim 3, said first solenoid valve being a three position, two outlet solenoid valve.

5. The unloader of claim 3, said control unit for opening and closing said outlet valve comprising an electronic control unit.

6. The unloader of claim 5, each of said control and monitor units including an air pressure sensor for detecting the pressed air pressure within each said unit, said actuation means for operating said overflow valve of each said unit comprising a second solenoid valve, said electronic control unit being constructed and arranged to operate each said second solenoid valve separately in response to the air pressure detected by each said air pressure sensor, respectively.

7. The unloader of claim 6, wherein each said control and monitor unit check valve comprises a control rod constructed and arranged to be moved toward and away from said control and monitor unit check valve and a piston formed at the end of said control rod opposite said check valve, said piston being positioned within a pressure chamber and being actuated by said second solenoid valve.

8. The unloader of claim 7, wherein at least two of said control and monitor unit pistons are commonly actuated by one of said second solenoid valves common to both of said at least two pistons.

9. The unloader of claim 5, said unloader further comprising a regeneration air dryer, said air dryer being formed as a part of the air chamber and positioned therein upstream of the air chamber check valve, said air dryer also including a third solenoid valve for directing compressed air through said air dryer, said third solenoid valve being controlled by said electronic control unit.

10. The unloader of claim 1, wherein said control and monitor unit check valve and said overflow valve are formed as an integral unit.

11. The unloader of claim 1, each control and monitor unit including a safety valve positioned downstream of each said control and monitor unit check valve, said safety valve having an opening air pressure, said outlet valve having an opening air pressure, said control and monitor unit having a service pressure, wherein the opening pressure of the safety valve is greater than the service pressure of the control and monitor unit, and less than the opening pressure of the outlet valve.

12. The unloader of claim 1, wherein at least one of said multi-circuit control valves includes an air pressure throttle formed within the housing in parallel with the check valve of said multi-circuit control valve for permitting, and regulating the rate of, air exchange between the compressed air held within the air chamber and the compressed air used within the compressed air braking or suspension circuit controlled by said multi-circuit control valve.

13. A compressed air unloader for unloading compressed air used in the compressed air braking and suspension circuits of a motor vehicle, the motor vehicle including an air compressor for producing the compressed air, said unloader comprising:

- a housing, said housing including an internal air chamber defined therein;
- a compressed air inlet defined within said housing and a compressed air outlet also defined within said housing, both of said inlet and said outlet extending from outside of said housing into said air chamber and being in sealed communication with said air chamber;
- said outlet including a controlled outlet valve, said outlet valve being constructed and arranged to vent said air chamber to the atmosphere in an open position;
- a control unit for opening and closing said outlet valve;
- said air chamber having an opening defined therein for passing compressed air toward a multi-circuit control valve assembly formed as a part of said housing and a check valve positioned within said opening, said multi-circuit control valve being constructed and arranged to control the braking and suspension circuits of the motor vehicle;
- a pressure sensor positioned within said housing intermediate said check valve and said control valve assembly;
- said control valve assembly including a plurality of generally identical control and monitor units positioned downstream of said check valve, each of said units being separately furnished with compressed air from said air chamber;

each said control and monitor unit comprising:
- a) a control and monitor unit check valve opening against the air flow direction within said control and monitor unit;
- b) an overflow valve for passing compressed air from said control and monitor unit;
- c) actuating means for operating said overflow valve; and
- d) an air pressure sensor positioned downstream of said control and monitor unit check valve.

14. The unloader of claim 13, said actuation means for each said overflow valve comprising a first solenoid valve.

15. The unloader of claim 13, said control unit for opening and closing said outlet valve comprising an electronic control unit, each of said control and monitor units including an air pressure sensor for detecting the compressed air pressure within each said unit, said actuation means for operating said overflow valve of each said unit comprising a second solenoid valve, said electronic control unit being constructed and arranged to operate each said second solenoid valve separately in response to the air pressure detected by each said air pressure sensor, respectively.

16. The unloader of claim 15, wherein each said control and monitor unit check valve comprises a control rod constructed and arranged to be moved toward and away from said check valve and a piston formed at the end of said control rod opposite said check valve, said piston being positioned within a pressure chamber and being actuated by said second solenoid valve.

17. The unloader of claim 16, wherein at least two of said control and monitor unit pistons are commonly actuated by one of said second solenoid valves common to both of said at least two pistons.

18. The unloader of claim 15, said unloader further comprising a regenerating air dryer, said air dryer formed as a part of said air chamber and positioned therein upstream of the air chamber check valve, said air dryer also including a third solenoid valve for directing compressed air through said air dryer, said third solenoid valve being controlled by said electronic control unit.

19. The unloader of claim 13, wherein said control and monitor unit check valve and said overflow valve are formed as an integral unit.

* * * * *